Patented Sept. 15, 1942

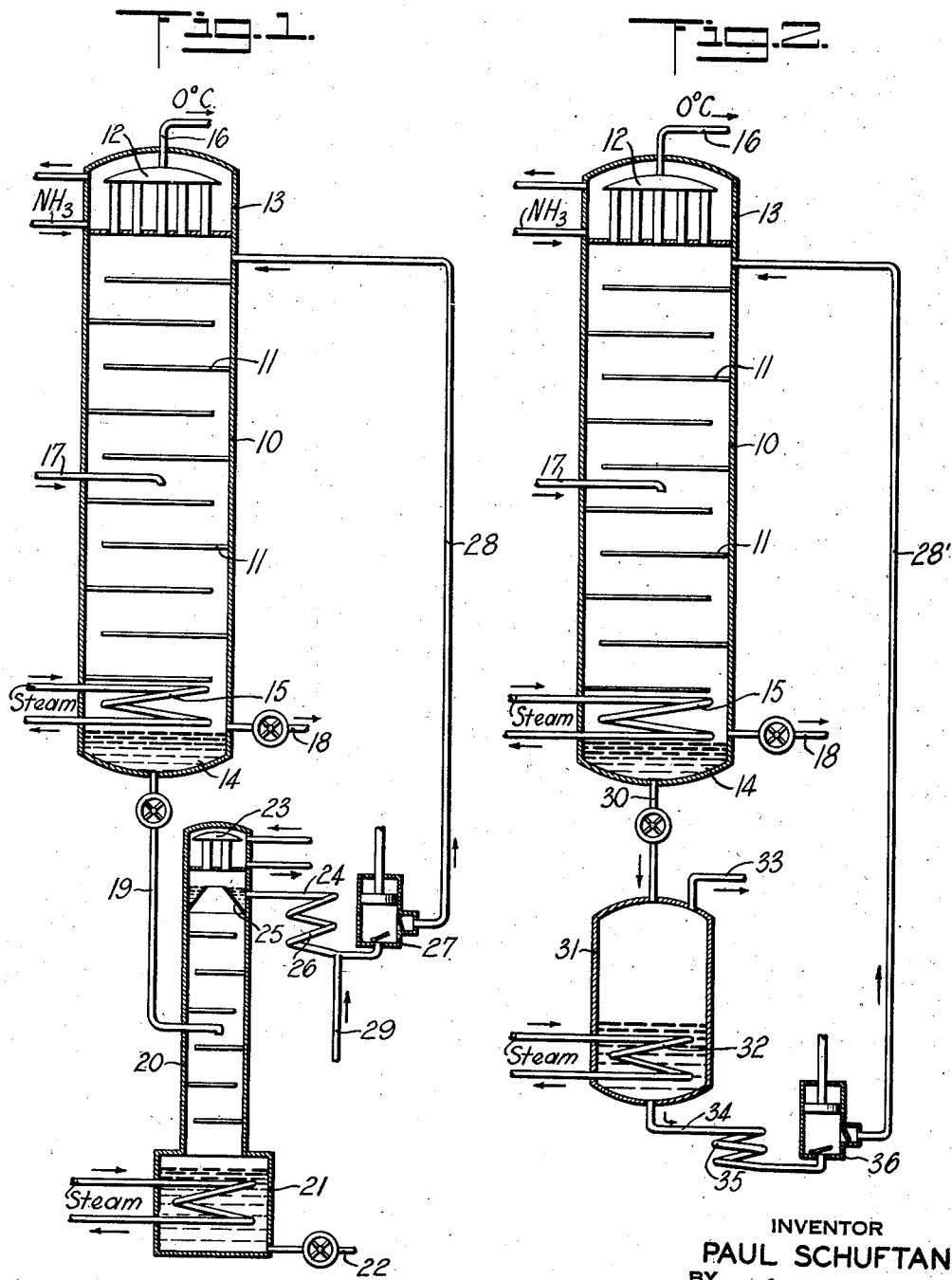

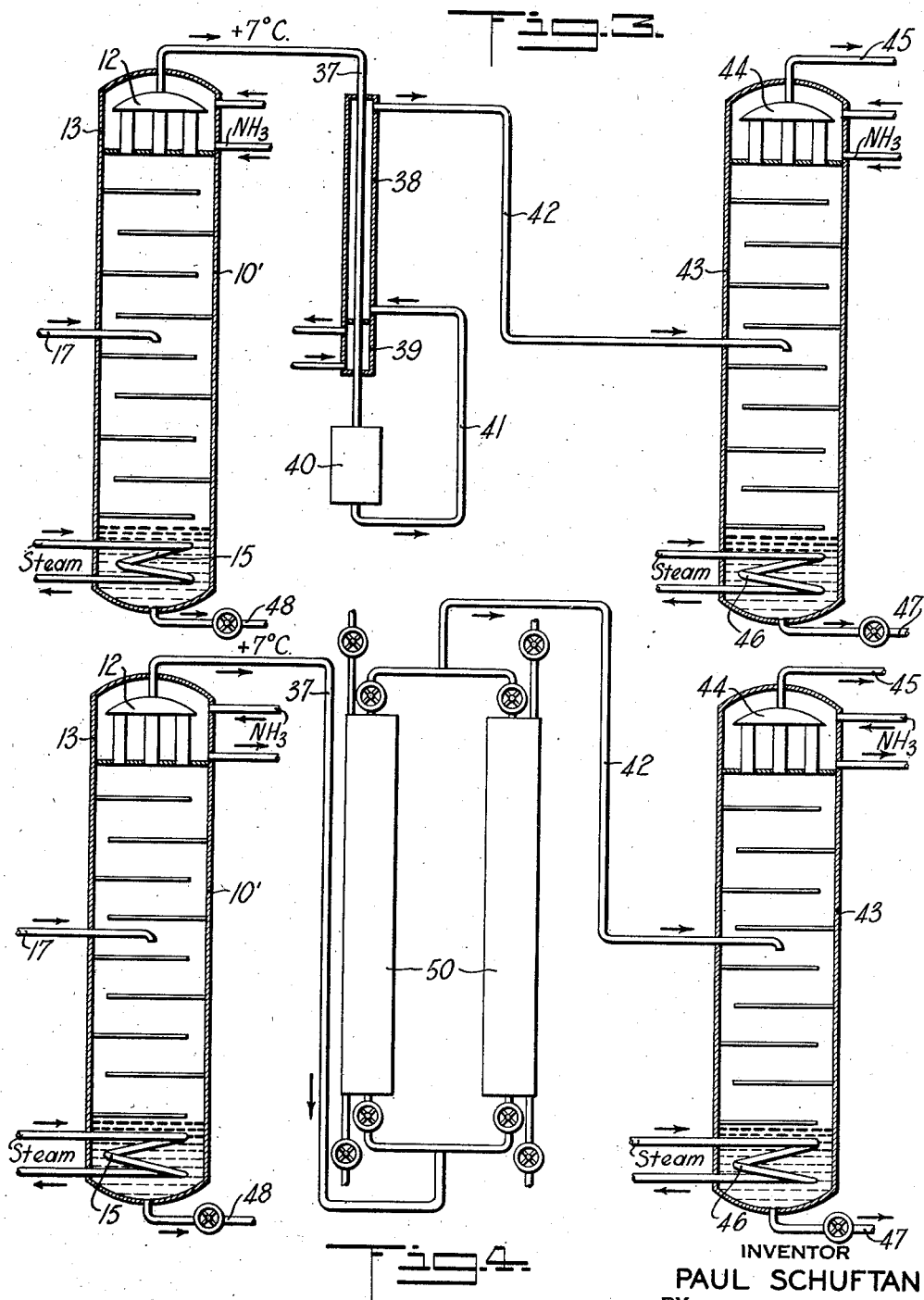

2,295,809

UNITED STATES PATENT OFFICE 2,295,809

PROCESS FOR THE ELIMINATION OF MOISTURE DIFFICULTIES IN THE SEPARATION OF HYDROCARBON MIXTURES

Paul Schuftan, Richmond, England

Application December 2, 1937, Serial No. 177,754
In Germany January 23, 1937

8 Claims. (Cl. 62—175.5)

This invention relates to a process for the elimination of moisture difficulties in the low temperature separation of hydrocarbon mixtures such as by cooling and rectification, and more particularly to the prevention of the tendency of water or water vapor contained in mixtures of hydrocarbons having two or more carbon atoms to the molecule to form obstructions before or during the processing of such mixtures at relatively low temperatures.

In the separation of mixtures of hydrocarbons containing two or more carbon atoms in the molecule or the separation of such mixtures from cracked gases, hydrogenation gases, etc., as is done, for example, in the production of motor fuels, surprisingly disturbing obstructions of condensers and rectification trays occur in temperature zones which have not yet dropped below the freezing points of the gas components. The causes of such obstructions, as has been shown by exhaustive tests, are found in the formation of gas hydrates.

It was possible to eliminate these difficulties by quantitatively removing the water contained in the gas mixture prior to starting the separation. However, drying of this type by means of the known methods of absorption, adsorption or condensation is accompanied by various difficulties.

The principal object of the present invention is to provide a simple, economical process for the prevention of the difficulties which can be caused by the formation of gas hydrates in the separation of moist hydrocarbon mixtures.

The above and other objects and novel features of this invention will become apparent from the following description taken with the accompanying drawings, in which:

Fig. 1 is a diagrammatic sectional elevation of an exemplary apparatus for practicing the process according to the invention;

Fig. 2 is a similar view of another form of such apparatus;

Fig. 3 is a similar view of a form of apparatus for practicing another phase of the invention; and Fig. 4 is a similar view of still another form of apparatus for practicing a modification of the process according to the invention.

According to the invention, the greatest possible quantity of water is removed in liquid form during the course of the separation by first cooling the hydrocarbon mixture to a temperature of approximately 0° and during such cooling keeping the propane and/or water vapor partial pressure lower than the propane and/or water vapor pressure respectively, over propane hydrate. Then only is the gas mixture leaving this cooling stage dried prior to further cooling. The separation is carried out in at least two cooling stages, in particular when simultaneously separating hydrocarbons which boil lower and higher than hydrocarbons with 4 C-atoms, whereby the lowest temperature of the first cooling stage, with lower propane and water-vapor partial pressures than the saturation pressures over propane hydrate, lies preferably above 0° and then the gas mixture leaving this cooling stage is dried.

An exhaustive investigation has shown that the difficulty could be chiefly traced to the formation of propane hydrate which in general occurs only at temperatures below 7° C., when the partial pressure of the propane and the water vapor below this temperature is greater than over pure propane hydrate. On the basis of this knowledge, the principal quantities of moisture contained in the gas can be removed in liquid form during the separation process and only the relatively small residual moisture contained in the gas at 7° C. or even lower temperatures can be removed by means of a special drying process.

The new process is carried out, for example, in such a manner that the temperature at the top of that particular column in which the hydrocarbons with four and more carbon atoms are separated, is maintained above 7° C. through suitable selection of the separation pressure. The gas mixture leaving this column is then dried.

If the drying is effected through absorption or adsorption of the water, substances should be utilized which do not contain polymerization catalysts, such as, for example, phosphoric acid. The drying can also be carried out through intermediate cooling of the gas mixture to the lowest possible temperature. Apparatuses are hereby used in which no difficulties can occur as a result of the separation of ice and the formation of gas hydrates. The cooled mixture is then filtered before being again heated.

A somewhat deviating method of operation consists in dropping below the temperature of 7° C. in the upper portion of the column in which the hydrocarbons with four and more carbon atoms are separated, which is sometimes advisable, in order to avoid excessive separation pressures. Under these circumstances, the partial pressure of the water vapor is reduced, according to the invention, in temperature ranges in which, with sufficient propane partial pressure, the formation of propane hydrate could occur, by the addition of water soluble components such as, for example, methyl alcohol, to the reflux liquid. The solvent-water mixture collected in the sump of the column is then again processed into pure solvent which is returned to the cycle.

The water vapor partial pressure can sometimes also be sufficiently reduced below the critical value for the formation of gas hydrates in those temperature ranges in which hydrates formation is possible, by the addition of a salt solution to the reflux liquid in place of a solvent for water, which effects a fairly complete removal of the water through rectification action. It was found that even with approximately only 10% of the dissolved substances in the aqueous solution, the formation temperature of the hydrate was reduced by four to five degrees.

The degree of drying is dependent upon the partial pressure of the hydrate forming gases as well as the lowest temperatures which must be attained during the separation.

It was surprisingly shown, namely, that the separation of hydrates even at low water vapor partial pressures would cause undesirable obstructions, in particular, at low temperatures (below −30° C.). The quantities of ice resulting solely from vapor condensation at these temperatures are so small, or are washed away by the other condensates, that they involve no difficulties, which, on the contrary, is not the case where the possibility of hydrate formation exists. As a result, the drying must be carried out with special care when temperatures below −30° C. occur in subsequent further separations in which low boiling point components are separated. If necessary, under these circumstances, the drying is carried out, according to the invention, in two stages. The first stage of the drying is carried out in the described manner while the second stage, in which the last traces of water vapor are removed, is preferably interposed into the separation process where lower temperatures occur, inasmuch as all the drying processes then operate with appreciably greater efficiencies in view of the lower water vapor saturation pressure, the previous removal of the more easily condensible gas components, and the reduced gas volume.

The procedure in which a solvent for water such as alcohol is employed may be effected in the apparatus shown in Fig. 1, in which 10 indicates a rectifying column. The column 10 is provided with customary kind of counter current contact trays 11, with a condenser 12 at its upper end cooled by a refrigerant such as ammonia which is circulated through the jacket 13 surrounding the condenser 12, and at its lower end with a sump 14 above which is disposed a heating coil 15 that may be heated by a suitable agent such as steam passed therethrough. The non-condensed gases passing through the condenser are conducted therefrom by a conduit 16. The condenser 12 preferably cools the gas to about 0° C. The hydrocarbon gas mixture containing moisture is conducted into the column 10 at about its mid-portion by conduit 17 and is washed by contact with the reflux liquid passing down the column, part of the reflux liquid being produced by condensation of fractions of the gas mixture that reach the condenser 12. At a point just above the liquid level in the sump 14 is provided a gas withdrawal conduit 18 through which the separated components of the mixture including hydrocarbons having four and more carbon atoms to the molecule are withdrawn for subsequent use or treatment.

According to the invention difficulties due to the formation of gas hydrates at temperatures below 7° C., are overcome by maintaining the water vapor partial pressure in the upper portion of the column 10 at such a low value that the formation of gas hydrates is avoided. To this end a water absorbing or dissolving liquid such as, for example, alcohol is added to the reflux liquid being produced by the condenser 12. The partial pressure of the water vapor in the mixture is thereby effectively reduced to the desired low value.

In the sump 14, a solution of water in the solvent alcohol is collected. This solution may be withdrawn through conduit 19 and treated to separate the water from the solvent so that the solvent recovered may be recycled. To rectify the alcohol an auxiliary column 20 may be employed. The column 20 is provided with a steam heated kettle 21 at its lower end from which water is withdrawn at 22, and with a cooled condenser 23 at its upper end to provide a reflux liquid for the column. The solution is conducted by conduit 19 into the column 20 and part of the alcohol condensed is withdrawn by conduit 24 from a collecting shelf 25 under the condenser 23. The alcohol drawn from the column 20 is cooled to about 0° C. by passage through a cooling coil 26 and pumped back into the column 10 by means of the pump 27 through pipe 28 which connects the discharge of the pump to the upper end of column 10. To make up losses of alcohol in the system a supply of fresh alcohol may be added as needed thru connection 29 to conduit 24.

Referring to Fig. 2, an apparatus is shown in which, instead of alcohol, a concentrated salt solution is employed. A suitable solution may, for example, be concentrated ammonium nitrite solution. The procedure is, in principle, similar. The salt solution is added to the reflux liquid of the column 10 through pipe 28′ and collects in the sump 14 from which it flows through connection 30 into a chamber 31. The moisture absorbed by the solution is driven off by heat supplied by the steam heated coil 32 in the lower part of the chamber 31. The water vapor boiled out of the solution is discharged through pipe 33 at the upper end of the chamber and the concentrated solution is drawn from the lower portion of the chamber through pipe 34. The solution is cooled to 0° C. in cooling coil 35 and passed into a pump 36 discharging to pipe 28′.

Fig. 3 illustrates a somewhat differing procedure in which the moisture separation is effected between stages. In the first stage column 10′ the cooling of the gas is limited so that the lowest temperature is not lower than 7° C., the critical temperature. The gaseous product of this first stage separation is conducted by conduit 37 in counter current heat exchange with gas in heat exchanger 38, then with a refrigerant in cooler 39 and into a filter 40. From the filter 40 the gas is passed to the colder end of heat exchanger 38 by connection 41. The refrigerant employed in cooler 39 may be ammonia and preferably maintains a temperature low enough to effect a thorough drying of the gas by freezing out the moisture. The solidified moisture in the form of ice particles is separated by the filter 40 which may, if desired, be installed in duplicate in order that one filter may be cleaned while the other maintains operation without interruption.

The filtered gas mixture is conducted from heat exchanger 38 through pipe 42 to the next stage rectifying column 43 which similarly to the preceding column, is provided with a refrigerated condenser 44 at its upper end from which the separated gaseous non-condensed fraction issues through conduit 45. The lower portion of column 43 is heated by steam coil 46 while hydrocarbons having three carbon atoms to the molecule are withdrawn at 47. From the lower end of column 10' through connection 48 is collected a hydrocarbon fraction containing four and more carbon atoms to the molecule. The moisture in the gas passing through pipe 37 may also be removed by passing it through adsorbents or through absorbents such as phosphoric acid instead of by cooling and filtering.

Referring to Fig. 4 the adsorbent or absorbent material may be retained and supported within suitable containers 50 interposed between the conduits 37 and 42 that conduct the gas mixture from the top of column 10' to the mid-portion of column 42. The containers 50 are preferably installed in duplicate as shown in order that one may be in service while the other is isolated to permit renewal or regeneration of its absorbent or adsorbent material in a customary manner.

In Figs. 3 and 4, the heat supplied by coil 15 is regulated so that only hydrocarbons with three carbon atoms in the molecule are vaporized and the hydrocarbons having four atoms are accumulated and withdrawn through the connection 48. Since the rectification is accomplished above 7° C. no gas hydrates are formed and any moisture in the liquid state is withdrawn with the hydrocarbons at connection 48. Moisture that remains in the vapor state passes out with the gas through conduit 37 and is removed as described.

I claim:

1. In a process for the low temperature separation of hydrocarbon gas mixtures compressed to separation pressure and containing propane and moisture, the steps comprising cooling the gas mixture to be separated to a temperature no lower than 7° C. whereby a substantial portion of said moisture is liquefied; collecting and withdrawing the thus condensed moisture; then cooling said gas mixture to a temperature of about 0° C. while maintaining the partial pressure of the water vapor in said gas mixture at a value substantially lower than the partial pressure of water vapor in equilibrium with propane hydrate at the same temperature; and separating said gas mixture while under the said pressure and temperature environment.

2. In a process for the low temperature separation of hydrocarbon gas mixtures compressed to separation pressure and containing propane and moisture, the steps comprising cooling the gas mixture to be separated to a temperature below 7° C.; admixing with said gas mixture sufficient quantities of a liquid in which water is soluble for reducing the water vapor partial pressure in said mixture to a value below the critical value at which solid gas hydrates tend to form; and separating said gas mixture at a temperature between an upper limit of about 7° C. and a lower limit at least as low as 0° C. and at which temperature no solid hydrates will form during said separation.

3. In a process for the low temperature separation of hydrocarbon gas mixtures compressed to separation pressure and containing propane and moisture, the steps comprising cooling the gas mixture to be separated to a temperature of below 7° C.; admixing with said gas mixture sufficient quantities of an alcohol in which water is soluble for reducing the water vapor partial pressure in said mixture to a value below the critical value at which solid gas hydrates tend to form; and separating said gas mixture at a temperature between an upper limit of about 7° C. and a lower limit at least as low as 0° C. and at which temperature no solid hydrates will form during said separation.

4. In a process for the low temperature separation of hydrocarbon gas mixtures compressed to separation pressure and containing propane and moisture, the steps comprising cooling the gas mixture to be separated to a temperature below 7° C.; admixing with said gas mixture sufficient quantities of a solution of a salt in water for reducing the water vapor partial pressure in said mixture to a value below the critical value at which solid gas hydrates tend to form; and separating said gas mixture at a temperature between an upper limit of about 7° C. and a lower limit at least as low as 0° C. and at which temperature no solid hydrates will form during said separation.

5. In a process for the low temperature separation of hydrocarbon gas mixtures compressed to separation pressure and containing propane and moisture, the steps comprising cooling the gas mixture to be separated to a temperature above about 7° C. whereby a substantial portion of said moisture is liquefied; collecting and withdrawing the thus condensed moisture; then further drying said gas mixture by contact with a water absorption material; further cooling said dried gas mixture to a temperature substantially below 7° C.; and effecting a separation of the gas mixture at said lower temperature.

6. In a process for the low temperature separation of hydrocarbon gas mixtures compressed to separation pressure and containing propane and moisture, the steps comprising cooling the gas mixture to be separated to a temperature above about 7° C. whereby a substantial portion of said moisture is liquefied; collecting and withdrawing the thus condensed moisture; then further drying said gas mixture by contact with a water adsorption material; further cooling said dried gas mixture to a temperature substantially below 7° C.; and effecting a separation of the gas mixture at said lower temperature.

7. In a process for the low temperature separation of hydrocarbon gas mixtures compressed to separation pressure and containing propane and moisture, the steps comprising cooling the gas mixture to be separated to a temperature above about 7° C. whereby a substantial portion of said moisture is liquefied; collecting and withdrawing the thus condensed moisture; then further drying said gas mixture by cooling said gas mixture to a temperature low enough to cause the remaining moisture to become solidified and form finely divided solid particles; removing said finely divided solid from said gas mixture by filtration; and separating said dried gas mixture after reheating to separation temperature.

8. In a process for the low temperature separation of hydrocarbon gas mixtures compressed to separation pressure and containing propane and moisture, the steps comprising cooling the gas mixture to be separated to a temperature above about 7° C. whereby a substantial portion of said moisture is liquefied; collecting and withdrawing the thus condensed moisture; withdrawing and completely drying the remaining gas mixture; adjusting the temperature of the dried gas mixture to a value substantially below 7° C. suitable for separation of the components; and effecting a separation of the dried gas mixture at said adjusted temperature.

PAUL SCHUFTAN.